(12) United States Patent
Swanberg

(10) Patent No.: US 6,804,729 B2
(45) Date of Patent: Oct. 12, 2004

(54) MIGRATING A MEMORY PAGE BY MODIFYING A PAGE MIGRATION STATE OF A STATE MACHINE ASSOCIATED WITH A DMA MAPPER BASED ON A STATE NOTIFICATION FROM AN OPERATING SYSTEM KERNEL

(75) Inventor: Randal Craig Swanberg, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 205 days.

(21) Appl. No.: 10/261,864

(22) Filed: Sep. 30, 2002

(65) Prior Publication Data

US 2004/0064601 A1 Apr. 1, 2004

(51) Int. Cl.⁷ .............................................. G06F 13/28
(52) U.S. Cl. .......................... 710/22; 719/318; 719/321
(58) Field of Search ...................... 710/22–28; 719/318, 719/321; 718/1, 100

(56) References Cited

U.S. PATENT DOCUMENTS 5,875,289 A * 2/1999 Woodruff et al. .............. 714/9
6,594,708 B1 * 7/2003 Slaughter et al. ........... 719/315
2003/0140179 A1 * 7/2003 Wit et al. .................... 709/321

OTHER PUBLICATIONS

AUS920020510US1, Fleming et al., Method and Apparatus for Managing a Dynamic Alias Page Table.

* cited by examiner

Primary Examiner—Ilwoo Park
(74) Attorney, Agent, or Firm—Duke W. Yee; Mark E. McBurney; Stephen J. Walder, Jr.

(57) ABSTRACT

An atomic memory migration apparatus and method are provided. With the apparatus and method, all active DMA mappings to a given physical page of memory are identified and future mappings/unmappings to the physical page are serialized with migrations of current mappings. The identified DMA mappings are then disabled at the bus level and the physical page is migrated to a new memory page. All existing DMA mappings are also migrated to the new page. After migration is completed, the DMA mappings, which have now been migrated to the new page, are reenabled at the bus level.

37 Claims, 8 Drawing Sheets

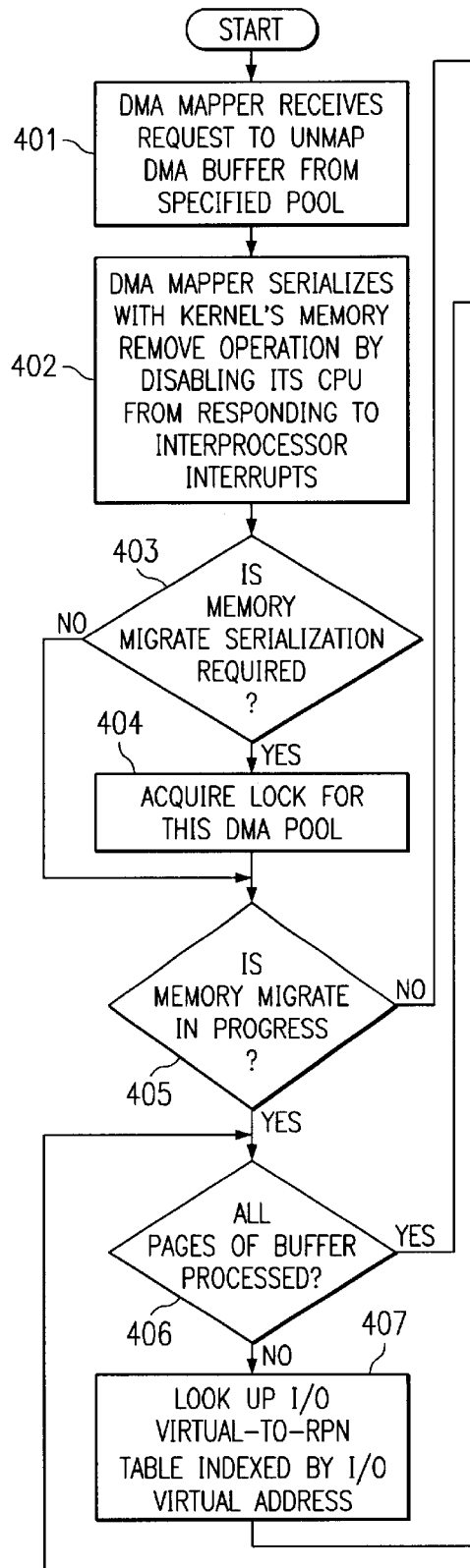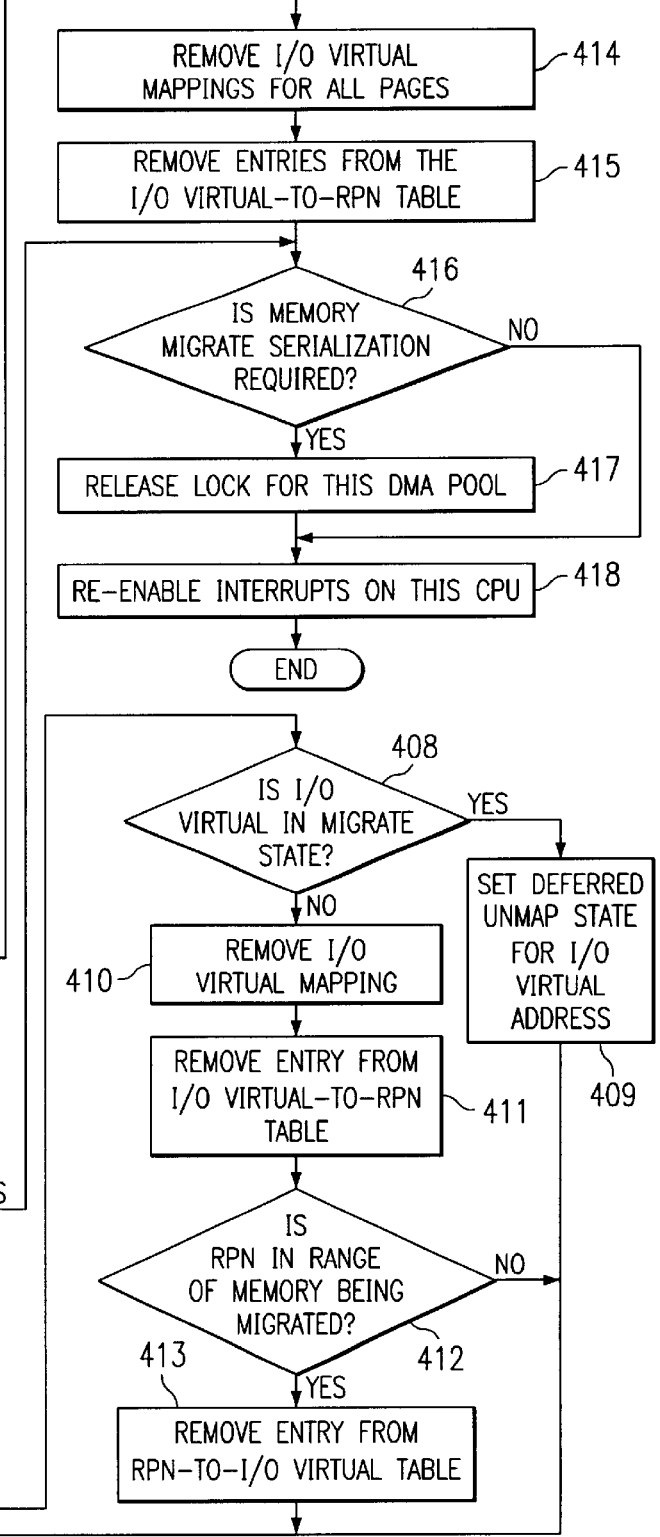
FIG. 4

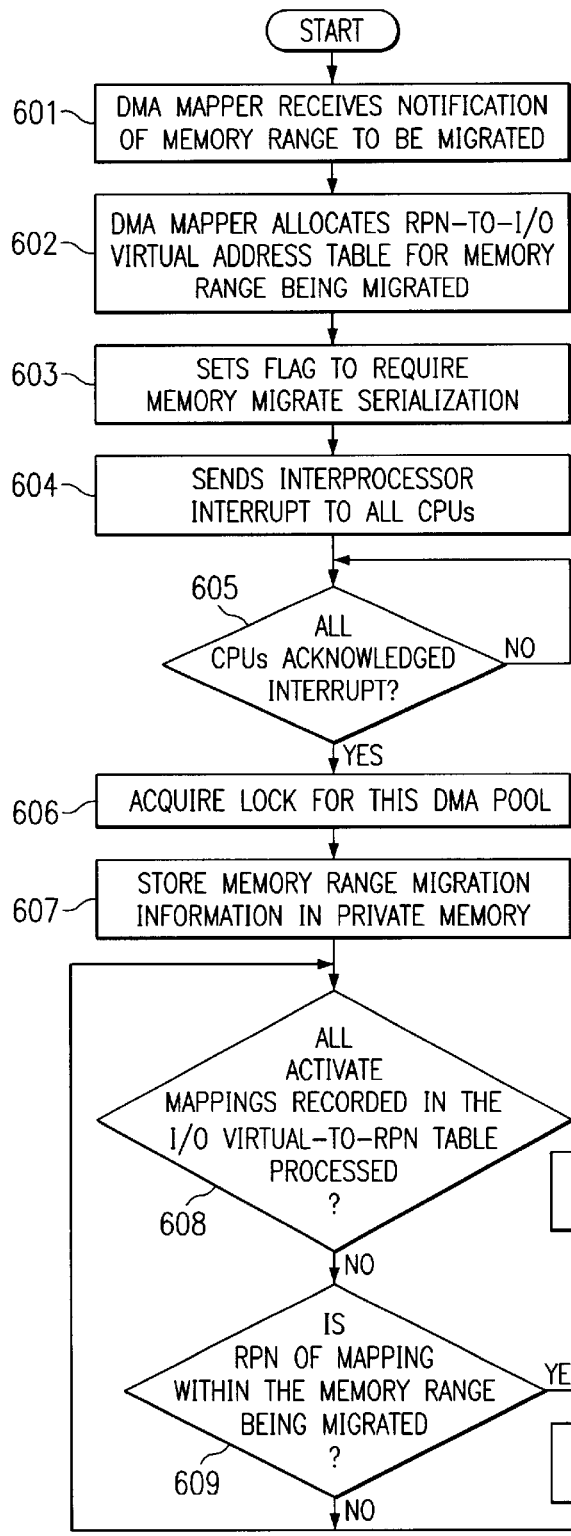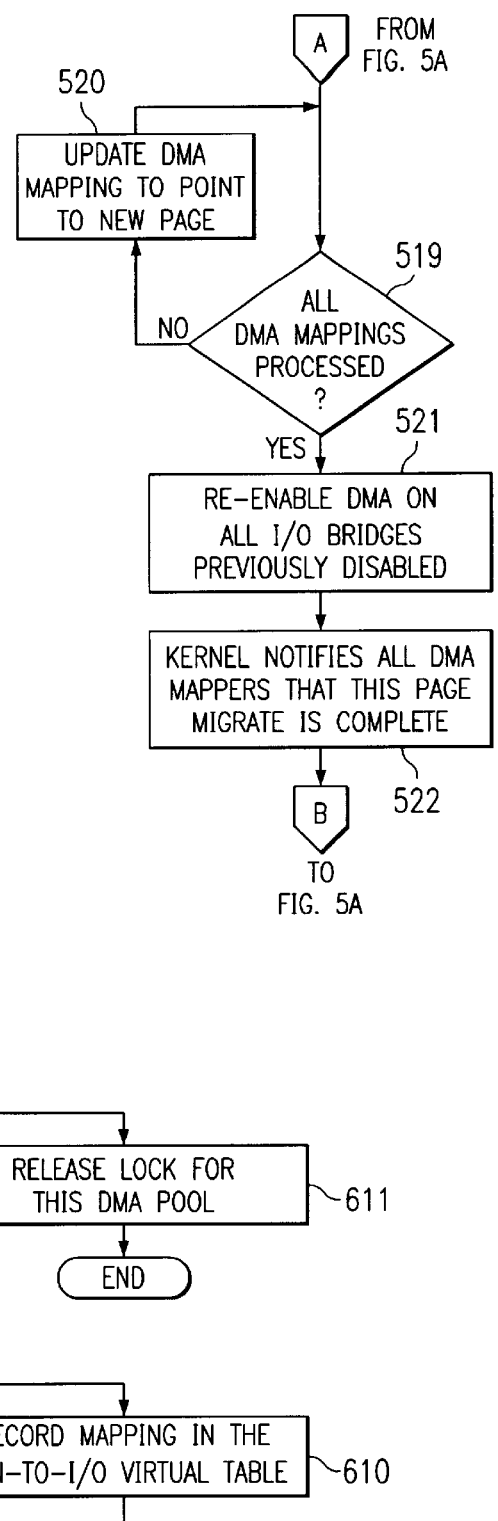

MIGRATING A MEMORY PAGE BY MODIFYING A PAGE MIGRATION STATE OF A STATE MACHINE ASSOCIATED WITH A DMA MAPPER BASED ON A STATE NOTIFICATION FROM AN OPERATING SYSTEM KERNEL

BACKGROUND OF THE INVENTION

1. Technical Field

The present invention is directed to an atomic memory migration method and apparatus. More specifically, the present invention is directed to a method of migrating memory that is the target of a Direct Memory Access (DMA), i.e. memory-to-memory, operation.

2. Description of Related Art

The migration of memory is a key building block used to support such operations as dynamic removal of memory or dynamic accumulation of physically contiguous page frames. For memory pages that are only referenced by central processing units (CPUs), there are straightforward methods for ensuring atomic access to the memory page, such as removing all translations to the page and spinning in fault handlers if the page is undergoing migration. However, pages that are also the targets of Direct Memory Access (DMA) operations by external input/output (I/O) agents are far more difficult to manage.

The difficulty in migrating memory that is the target of DMA operations is that the DMA operations are not performed by the CPUs and thus, the CPU cannot simply be placed in a fault handler spin state during the migration period. It is necessary to ensure that all possible outstanding DMA operations by I/O agents on the page that is subject to migration, are suspended during the period of the migration. This is difficult because I/O agents in the system represent autonomous processing units that can asynchronously read and write system memory. The operating system is physically executed on the system's central processing units (CPUs) and can synchronously control the access to system memory from CPUs. The operating system has no direct control over the external I/O agents.

Thus, it would be beneficial to have a method and apparatus for migrating memory that is the target of DMA operations.

SUMMARY OF THE INVENTION

The present invention provides an atomic memory migration apparatus and method. With the present invention, all active DMA mappings to a given physical page of memory are identified and future mappings/unmappings to the physical page are serialized with migrations of current mappings. The identified DMA mappings are then disabled at the bus level and the physical page is migrated to a new memory page. All existing DMA mappings are also migrated to the new page. After migration is completed, the DMA mappings, which have now been migrated to the new page, are reenabled at the bus level.

With the present invention DMA mappers, i.e. DMA support layers such as drivers and management software for bus bridges or the like that are responsible for handling DMA operations, register with the operating system kernel as a DMA mapper. The DMA mappers include an event handler that is called for various page migration state transitions and adapts the DMA mappers to conform to the page migration state machine of the present invention.

The page migration state machine has six primary states: normal operation, memory migration pending, page query, page migrate start, page migrate end, and memory migration complete. In normal operation, the DMA mappers have their own registered set of devices/drivers for which they are managing DMA operations/mappings. In this mode, no explicit serialization is performed by the DMA mapper as it executes only in the context of the device driver which calls it, which is already serialized with respect to this device and DMA pool. The DMA mapper keeps a record of all active DMA mappings on a per-device granularity.

In response to a request to migrate a portion of memory identified by a range of addresses, the state machine transitions to the memory migration pending state. In the memory migration pending state, notification that there will be memory migration requests is sent from the operating system kernel to the DMA mappers. This notification informs the DMA mappers to incur the cost of building and maintaining mapping information data in order to track all DMA mappings to the specific address range. In addition, the notification causes the DMA mapper to incur locking and serialization overhead that is not required during the normal operation state.

In response to receiving the notification that memory migration requests will be sent, the DMA mapper sets a flag indicating that locking is required in all mapping paths and issues a synchronous interprocessor interrupt to all CPUs in the system. The interrupt is sent at an interrupt level less favored than the interrupt level of DMA operations. Thus, once all CPUs in the system have acknowledged the interrupt, the DMA mapper knows that all DMA critical operations have exited and new critical sections will see the flag requiring serialization.

The DMA mapper then serializes with the mapping and unmapping paths and scats the outstanding DMA mappings for mappings within the range of the migration target address range. The DMA mapper then establishes data structures to manage each of these DMA mappings that fall within the target address range.

The state machine transitions to the page query state in response to a query from the operating system, which is driving the page migration, as to whether the DMA mapper has a particular page mapped for DMA operations. In response to receiving this query, the DMA mapper serializes with new mappings/unmappings and looks to see if the specified page is DMA mapped. If the page is DMA mapped by the DMA mapper, a predetermined time period may be allowed to expire before the transition to the next state, page migrate start, is performed in order to allow for transient DMA mappings to expire.

Once the operating system kernel has performed all the necessary queries to the registered DMA mappers, the operating system kernel sends a notification to the DMA mappers that a specified page is now in a migration state and the state machines of the event handlers of the DMA mappers transition to the page migrate start state. In response to receiving this notification, the DMA mapper sets internal state so that any unmap attempts to the in-migrate page are deferred. The DMA mapper then accumulates all remaining active DMA mappings to the page and reports them to the operation system kernel. The operating system kernel, after accumulating all the mappings for the page from all DMA mappers in the system, utilizes a platform specific facility to disable DMA arbitration for each DMA mapping found, migrate the old page to the new page, update each DMA mapping with the new page, and then re-enable DMA arbitration.

Once the page migration is completed, the operating system kernel notifies the DMA mappers of the end of the page migration, whether or not the page migration was completed successfully or not. Receipt of this notification causes the state machine of the event handlers of the DMA mappers to transition to the page migrate end state. The DMA mapper performs any deferred unmaps that might have been initiated when the page was in migrate state. The DMA mapper also updates internal data structures to reflect the DMA mappings that now map to the new memory page. The previous query-migrate start-migrate end states are repeated for each page in the range that was communicated in the migrate pending state, prior to the migrate complete state.

The operating system kernel then notifies the DMA mappers that there will be no more memory migration requests and the DMA mappers transition to the memory migration complete state. The DMA mapper relaxes the serialization and locking that was turned on during the memory migrate pending state and frees any additional data structures that were allocated in order to track DMA mappings to the specified memory address range. The completion of this state is a return to the normal operation state.

Thus, the present invention provides a mechanism for atomically migrating a memory page with active DMA mappings. Furthermore, the present invention provides a mechanism for atomically migrating a memory page with concurrent DMA activity.

These and other features and advantages of the present invention will be described in, or will become apparent to those of ordinary skill in the art in view of, the following detailed description of the preferred embodiments.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 4 is a flowchart outlining an exemplary DMA unmap operation of a DMA mapper in accordance with the present invention;

FIGS. 5A–5B are flowcharts outlining an exemplary operation for performing atomic memory migration in accordance with the present invention;

FIG. 6 is a flowchart outlining an exemplary operation of a DMA mapper for a memory migration pending state;

DETAILED DESCRIPTION OF THE PREFERRED EMBODIMENT

Figure 1:
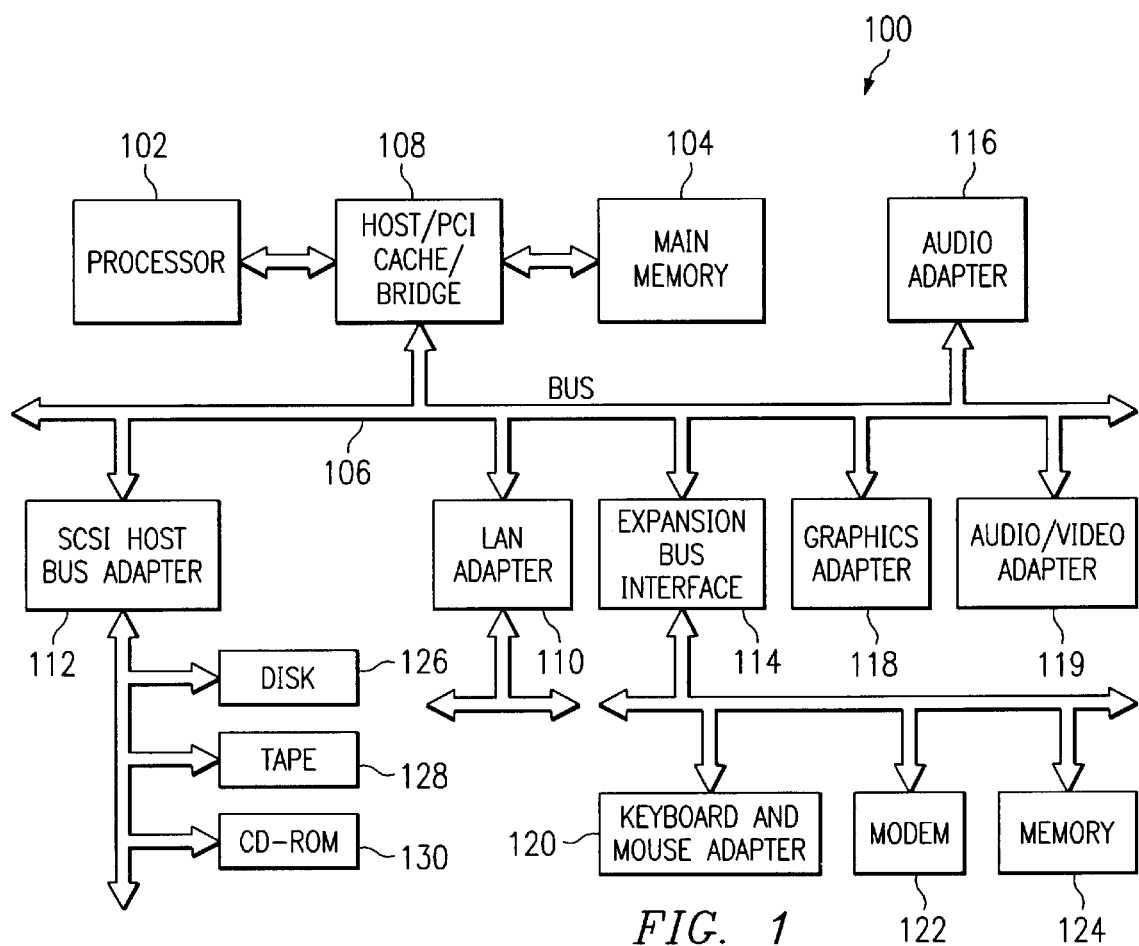
FIG. 1 is an exemplary block diagram of a data processing apparatus in which the present invention may be implemented.

With reference now to FIG. 1, a block diagram of a data processing system is shown in which the present invention may be implemented. Data processing system 100 is an example of a computer in which code or instructions implementing the processes of the present invention may be located. Data processing system 100 employs a peripheral component interconnect (PCI) local bus architecture. Although the depicted example employs a PCI bus, other bus architectures such as Accelerated Graphics Port (AGP) and Industry Standard Architecture (ISA) may be used. Processor 102 and main memory 104 are connected to PCI local bus 106 through PCI bridge 108. PCI bridge 108 also may include an integrated memory controller and cache memory for processor 102. Additional connections to PCI local bus 106 may be made through direct component interconnection or through add-in boards.

In the depicted example, local area network (LAN) adapter 110, small computer system interface SCSI host bus adapter 112, and expansion bus interface 114 are connected to PCI local bus 106 by direct component connection. In contrast, audio adapter 116, graphics adapter 118, and audio/video adapter 119 are connected to PCI local bus 106 by add-in boards inserted into expansion slots. Expansion bus interface 114 provides a connection for a keyboard and mouse adapter 120, modem 122, and additional memory 124. SCSI host bus adapter 112 provides a connection for hard disk drive 126, tape drive 128, and CD-ROM drive 130. Typical PCI local bus implementations will support three or four PCI expansion slots or add-in connectors.

An operating system runs on processor 102 and is used to coordinate and provide control of various components within data processing system 100 in FIG. 1. The operating system may be a commercially available operating system such as Windows XP, which is available from Microsoft Corporation. An object oriented programming system such as Java may run in conjunction with the operating system and provides calls to the operating system from Java programs or applications executing on data processing system 100. "Java" is a trademark of Sun Microsystems, Inc. Instructions for the operating system, the object-oriented programming system, and applications or programs are located on storage devices, such as hard disk drive 126, and may be loaded into main memory 104 for execution by processor 102.

Those of ordinary skill in the art will appreciate that the hardware in FIG. 1 may vary depending on the implementation. Other internal hardware or peripheral devices, such as flash read-only memory (ROM), equivalent nonvolatile memory, or optical disk drives and the like, may be used in addition to or in place of the hardware depicted in FIG. 1. Also, the processes of the present invention may be applied to a multiprocessor data processing system.

For example, data processing system 100, if optionally configured as a network computer, may not include SCSI host bus adapter 112, hard disk drive 126, tape drive 128, and CD-ROM 130. In that case, the computer, to be properly called a client computer, includes some type of network communication interface, such as LAN adapter 110, modem 122, or the like. As another example, data processing system 100 may be a stand-alone system configured to be bootable without relying on some type of network communication interface, whether or not data processing system 100 comprises some type of network communication interface. As a further example, data processing system 100 may be a personal digital assistant (PDA), which is configured with ROM and/or flash ROM to provide non-volatile memory for storing operating system files and/or user-generated data.

The depicted example in FIG. 1 is not meant to imply architectural limitations. For example, data processing system 100 also may be a notebook computer or hand held computer in addition to taking the form of a PDA. Data processing system 100 also may be a kiosk or a Web appliance.

The processes of the present invention are performed by processor 102 using computer implemented instructions, which may be located in a memory such as, for example, main memory 104, memory 124, or in one or more peripheral devices 126–130.

As previously stated above, the present invention provides an atomic memory migration apparatus and method for migrating memory regions that are the target of DMA operations. With the present invention DMA mappers, i.e. DMA support layers such as drivers and management software for bus bridges or the like that are responsible for handling DMA operations, register with the operating system kernel as a DMA mapper. The act of registering involves the DMA mapper providing the operating system kernel with the function pointer for the DMA mapper's state machine notification handler. The operating system kernel then maintains a list of DMA mapper functions to invoke upon each state transition.

Figure 2A:
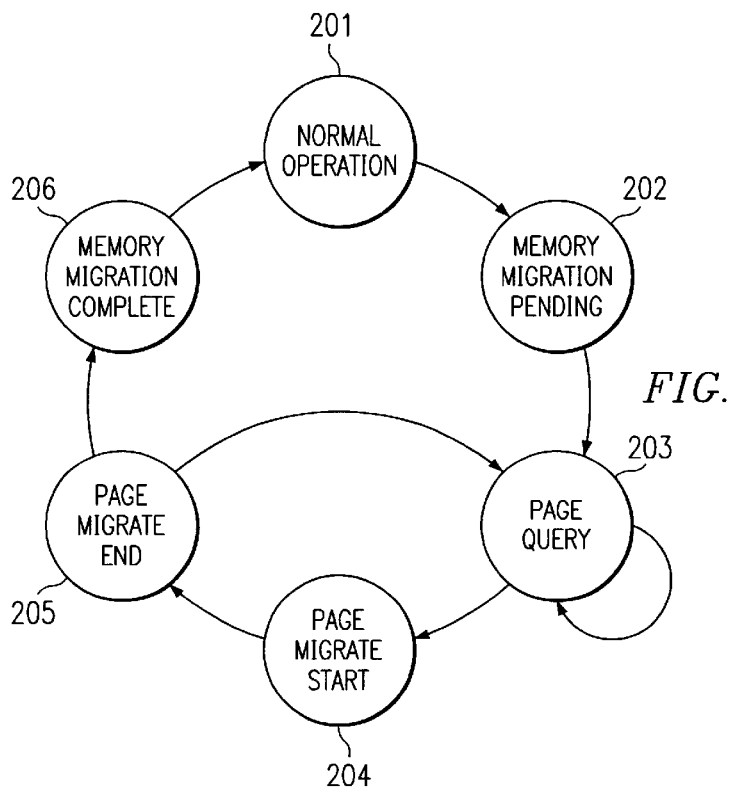
FIG. 2A is an exemplary diagram illustrating a state machine according to the present invention.

The DMA mappers include an event handler that is called for various page migration state transitions and adapts the DMA mappers to conform to the page migration state machine of the present invention. As shown in FIG. 2A, the page migration state machine has six primary states: normal operation 201, memory migration pending 202, page query 203, page migrate start 204, page migrate end 205, and memory migration complete 206. In normal operation 201, the DMA mappers have their own registered set of devices/drivers for which they are managing DMA operations/mappings. In this mode, no explicit serialization is performed by the DMA mapper as it executes only in the context of the device driver which calls it, which is already serialized with respect to this device and DMA pool. The DMA mapper keeps a record of all active DMA mappings on a per-device granularity.

In response to a request to migrate a portion of memory identified by a range of addresses, the state machine transitions to the memory migration pending state 202. In the memory migration pending state, notification that there will be memory migration requests is sent from the operating system kernel to the DMA mappers. This notification informs the DMA mappers to incur the cost of building and maintaining mapping information data in order to track all DMA mappings to the specific address range. In addition, the notification causes the DMA mapper to incur locking and serialization overhead that is not required during the normal operation state.

In response to receiving the notification that memory migration requests will be sent, the DMA mapper sets a flag indicating that locking is required in all mapping paths and issues a synchronous interprocessor interrupt to all CPUs in the system. The interrupt is sent at an interrupt level less favored than the interrupt level of DMA operations, allowing DMA mapping critical sections to hold off this interrupt until the mapping operation is complete. Thus, once all CPUs in the system have acknowledged the interrupt, the DMA mapper knows that all DMA critical operations have exited and new critical sections will see the flag requiring serialization.

The DMA mapper then serializes with the mapping and unmapping paths and scans the outstanding DMA mappings for mappings within the range of the migration target address range. The DMA mapper then establishes data structures to manage each of these DMA mappings that fall within the target address range.

The state machine transitions to the page query state 203 in response to a query from the operating system, which is driving the page migration, as to whether the DMA mapper has a particular page mapped for DMA operations. In response to receiving this query, the DMA mapper serializes with new mappings/unmappings and looks to see if the specified page is DMA mapped. If the page is DMA mapped by the DMA mapper, a predetermined time period may be allowed to expire in between a predetermined number of query state retries before the transition to the next state, page migrate start, is performed in order to allow for transient DMA mappings to expire.

Once the operating system kernel has performed all the necessary queries to the registered DMA mappers, the operating system kernel sends a notification to the DMA mappers that a specified page is now in a migration state and the state machines of the event handlers of the DMA mappers transition to the page migrate start state 204. In response to receiving this notification, the DMA mapper sets internal state so that any unmap attempts to the in-migrate page are deferred. The DMA mapper then accumulates all remaining active DMA mappings to the page and reports them to the operating system kernel. The operating system kernel, after accumulating all the mappings for the page from all DMA mappers in the system, utilizes a platform specific facility to disable DMA arbitration for each DMA mapping found, migrate the old page to the new page, update each DMA mapping with the new page, and then re-enable DMA arbitration.

Once the page migration is completed, the operating system kernel notifies the DMA mappers of the end of the page migration, whether or not the page migration was completed successfully or not. Receipt of this notification causes the state machine of the event handlers of the DMA mappers to transition to the page migrate end state 205. The DMA mapper performs any deferred unmaps that might have been initiated when the page was in migrate state. The DMA mapper also updates internal data structures to reflect the DMA mappings that now map to the new memory page. The states 203–205 repeate for each page in the address range that is being migrated.

The operating system kernel then notifies the DMA mappers that there will be no more memory migration requests and the DMA mappers transition to the memory migration complete state 206. The DMA mapper relaxes the serialization and locking that was turned on during the memory migrate pending state and frees any additional data structures that were allocated in order to track DMA mappings to the specified memory address range. The completion of this state is a return to the normal operation state.

Thus, the present invention provides a mechanism for atomically migrating a memory page with active DMA mappings. Furthermore, the present invention provides a mechanism for atomically migrating a memory page with concurrent DMA activity.

Figure 2B:
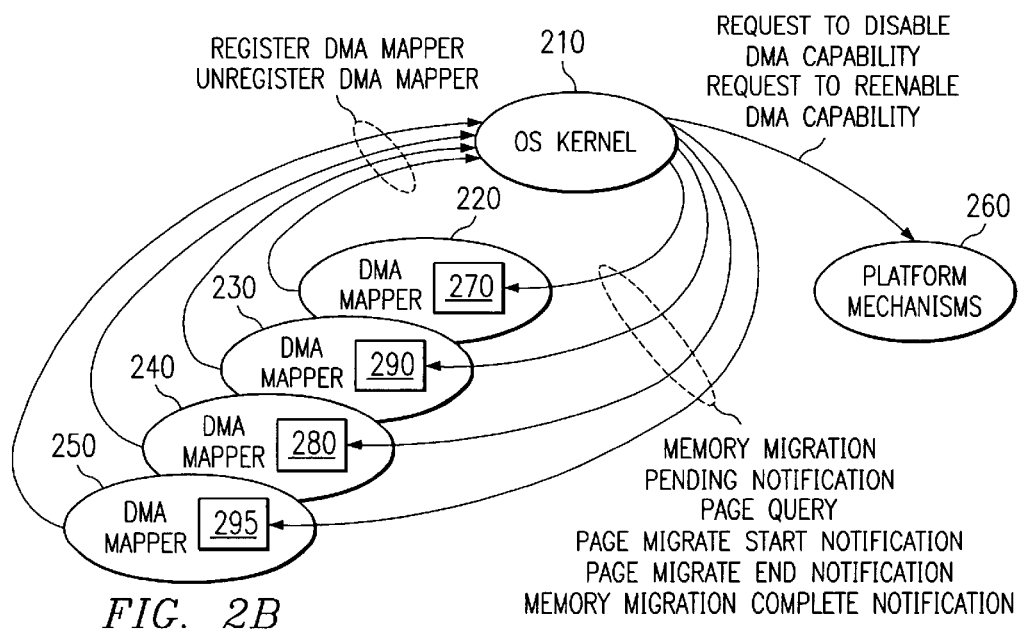
FIG. 2B is an exemplary diagram illustrating the interaction of the primary operational components of the present invention.

FIG. 2B is an exemplary diagram illustrating the interaction of the primary components of the present invention. As shown in FIG. 2B, the primary components of the present invention are the operating system kernel 210, DMA mappers 220–250, and platform mechanisms 260. The DMA mappers 220–250 have event handlers 270–295 that are used to implement the state machine of the present invention.

The DMA mappers 220–250 are DMA support layer entities that handle DMA mapping for devices underneath a particular bus bridge. For example, the DMA mappers 220–250 may be drivers and management software for bus bridges, e.g., PCI bus bridges, MicroChannel bus controllers, Shared Memory Architecture (SMA) controllers, Infiniband Host Bus Controllers, and the like.

The platform mechanisms 260 are platform specific mechanisms for disabling and re-enabling DMA arbitration for a particular I/O Bridge on a particular platform. For example, the platform specific mechanisms 260 may include a platform abstraction layer (PAL) that insulates the operating system kernel from the platform architecture. This PAL may receive requests for disabling or re-enabling DMA arbitration and instruct a platform specific facility, such as a hypervisor, to perform the actual functions of disabling or re-enabling DMA arbitration on an I/O bridge.

In accordance with the present invention, the operating system kernel 210 sends notifications to the DMA mappers 220–250 for changing the state, and hence the operation, of the DMA mappers 220–250. The event handlers 270–295 of the DMA mappers 220–250 receive these notifications and perform state transitions and orchestrate the various operations of the DMA mappers 220–250 based on these state transitions, as discussed previously and detailed hereafter. Through the use of the notifications sent by the operating system kernel 210 and the state machine operations implemented by the event handlers 270–295 of the DMA mappers 220–250, atomic migration of pages of memory may be performed even if the pages of memory are the target of DMA operations or are targeted for DMA operations during the migration of the pages of memory.

Figure 3:
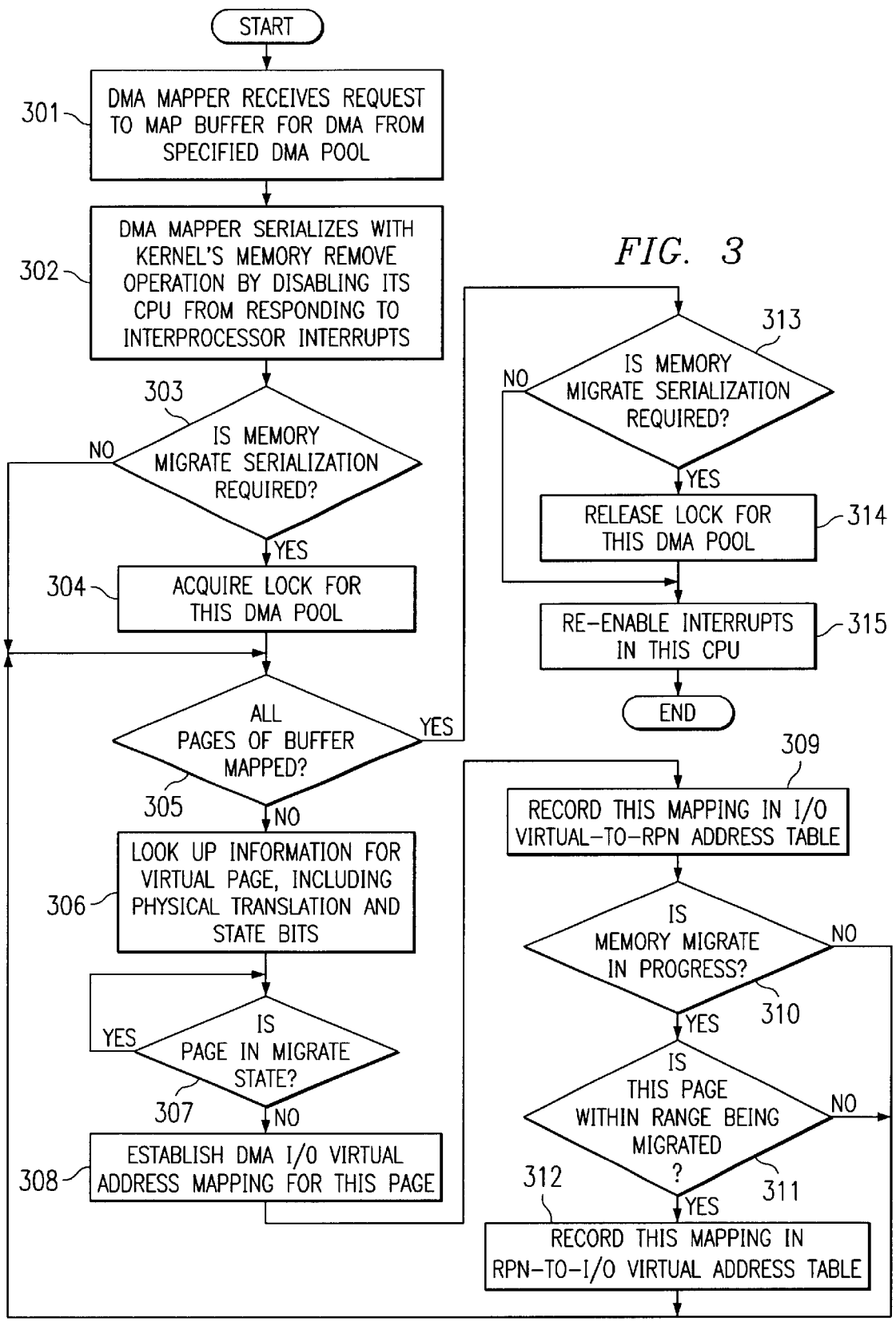
FIG. 3 is a flowchart outlining an exemplary DMA mapping operation of a DMA mapper in accordance with the present invention.

The DMA mappers 220–250 register and unregister pages of memory for use with DMA operations of the devices to which they are associated. FIG. 3 is a flowchart outlining an exemplary DMA mapping operation for registering a buffer for DMA operations in accordance with the present invention. As shown in FIG. 3, the operation starts with the DMA mapper receiving a request from a dependent device driver to map a buffer for DMA operations from a specified DMA memory page pool (step 301). The DMA pool is a range of I/O virtual addresses that a particular device beneath the I/O bridge is allocated to use.

The DMA mapper serializes with the operating system kernel's memory migration operation by disabling its CPU from responding to interprocessor interrupts (step 302). Disabling interrupts is CPU architecture specific. On PowerPC architectures, the disabling is performed by disabling external interrupts by clearing a bit in the machine status register.

A determination is then made as to whether memory migration serialization is required (step 303). The key point of the serialization is that normal operation does not require any explicit serialization on the DMA pool. All serialization is handled implicitly by the device driver serialization for the device requesting the DMA mapping operation. Thus, in normal operation, the DMA mapping and unmapping flags do not need to acquire any locks. Serialization is turned on by block 603 in FIG. 6, described hereafter, of the DMA mapper notification of migration pending. The act of turning on locking itself is accomplished in a consistent way with the use of the interrupt processor interrupt and acknowledgment mechanisms of blocks 604 and 605 in FIG. 6, discussed hereafter. The serialization is now explicitly required within the DMA mapper as it will be called regarding the same DMA pool not only by the owning device driver, but by the operating system kernel memory migration state machine notifications.

If memory migration serialization is required, a lock is acquired for the DMA pool (step 304). Thereafter, or if memory migration serialization is not required, a determination is made as to whether all pages of the buffer have been mapped for DMA (step 305). If not, a lookup of the information for a virtual memory page is performed (step 306) by querying the operating system kernel's software page table. This information includes the CPU virtual to physical address translation and state bits.

A determination is then made as to whether the physical memory page is in a migrate state (step 307). This determination may be performed based on the page state set by the kernel, such as in block 508 of FIG. 5A, described hereafter. If the page is in a migrate state, the operation continues to check the state until the page is no longer in a migrate state. If the page is not in a migrate state, a DMA I/O virtual address mapping for this page is established (step 308). This mapping is recorded in the I/O virtual address to physical address table (step 309).

The DMA I/O virtual address mapping is platform and I/O bridge specific. In a preferred embodiment, the I/O bridge utilizes an I/O page table to translate I/O reads/writes from its bus into system memory addresses to forward to the system bus. In some implementations, the DMA I/O virtual address mapping may be one to one with system memory. Thus, the establishment of a DMA I/O virtual address mapping in the preferred embodiment may store the I/O virtual to physical mapping in the I/O bridge's I/O page table. The DMA mapper records all I/O virtual to physical address mappings in its own data structure tables in memory.

A determination is then made as to whether memory migration is in progress (step 310), i.e. whether memory migration according to the present invention is being performed. This may be determined based on the memory migration flag set by the operating system kernel as discussed hereafter. If memory migration is not in progress, the operation returns to step 305. Otherwise, if a memory migration is in progress, a determination is made as to whether the page is within the address range of the memory that is being migrated (step 311). If not, the operation again returns to step 305. However, if this page is within the address range of memory being migrated, the mapping for this page is recorded in the physical to I/O virtual address table created by the DMA mapper to track DMA targeted pages, as discussed hereafter (step 312).

If all of the pages of the buffer are mapped (step 305), a determination is made as to whether memory migration serialization is required (step 313) similar to step 303 above. If so, then the lock for the DMA pool is released (step 314). Thereafter, or if memory migration serialization is not required, the interrupts in the CPU are re-enabled (step 315) and the operation ends. Enabling and disabling interrupts is CPU architecture specific. In the PowerPC architecture, disabling/enabling interrupts involves clearing/setting an enable bit in the machine status register. In IA64, for example, disabling/enabling interrupts involves clearing/setting an enable bit in the processor status register.

FIG. 4 is a flowchart outlining an exemplary DMA unmap operation of a DMA mapper in accordance with the present invention. As shown in FIG. 4, the operation starts with the DMA mapper receiving a request to unmap a DMA mapped buffer from a specified memory pool (step 401). The DMA mapper serializes with the operating system kernel's memory migration operation by disabling its CPU from responding to interprocessor interrupts (step 402). A determination is then made as to whether memory migration serialization is required (step 403). If memory migration serialization is required, a lock is acquired on the specified DMA pool (step 404). Thereafter, or if memory migration serialization is not required, a determination is made as to whether a memory migration is in progress (step 405).

If a memory migration is in progress, a determination is made as to whether all pages of the buffer have been processed (step 406). If not, the I/O virtual to physical mapping is looked up in the I/O virtual to physical address table (step 407). A determination is then made as to whether the I/O virtual address is in a migrate state (step 408). In this case (unmap of a previously performed mapping), this check coincides with block 805 of the migration start in FIG. 8, described hereafter. The migration of a physical memory page that is mapped for DMA results in two migrations: the first is the physical page contents are migrated to some new physical page and the second is the I/O virtual to physical address mapping is migrated to point to the new physical page. Step 408 refers to the second migration.

If the I/O virtual address is in a migrate state, a deferred unmap state is set for the I/O virtual address (step 409). This step essentially puts the unmap operation on hold until the memory migration is completed.

If the I/O virtual address is not in a migrate state, the I/O virtual mapping is removed (step 410) and the I/O virtual to physical address table entry is removed (step 411). A determination is then made as to whether the physical address is in the address range of the memory being migrated (step 412). If not, the operation returns to step 406. If the physical address is in the address range, the entry for the physical to I/O virtual address translation in the physical to I/O virtual address table is removed (step 413) and the operation returns to step 406.

If the a memory migration is not in progress (returning to step 405), the I/O virtual to physical address mappings for all pages of the buffer are removed (step 414) and the entries in the I/O virtual to physical address translation table for all of the pages of the buffer are removed (step 415). Thereafter, of if all pages of the buffer have been process (returning to step 406), a determination is made as to whether memory migration serialization is required (step 416) similar to step 403 above. If so, the lock on the DMA pool is released (step 417). Thereafter, or if memory migration serialization is not required, interrupts on the CPU are re-enabled (step 418) and the operation terminates.

The above flowcharts in FIGS. 3 and 4 illustrate how the DMA mappers may add and remove I/O virtual to physical address translations to the address translation tables used to manage virtual memory for DMA targeted memory regions, or pages. The following flowcharts will outline the kernel and DMA mapper operations necessary to perform the actual memory migration of DMA targeted memory regions according to the present invention.

As discussed above, the memory migration is performed using various states: normal operation, memory migration pending, page query, page migrate start, page migrate end, and memory migration complete. The functions of the operating system kernel and DMA mappers for each of these states is illustrated in FIGS. 5A–10 hereafter.

Figure 5A:
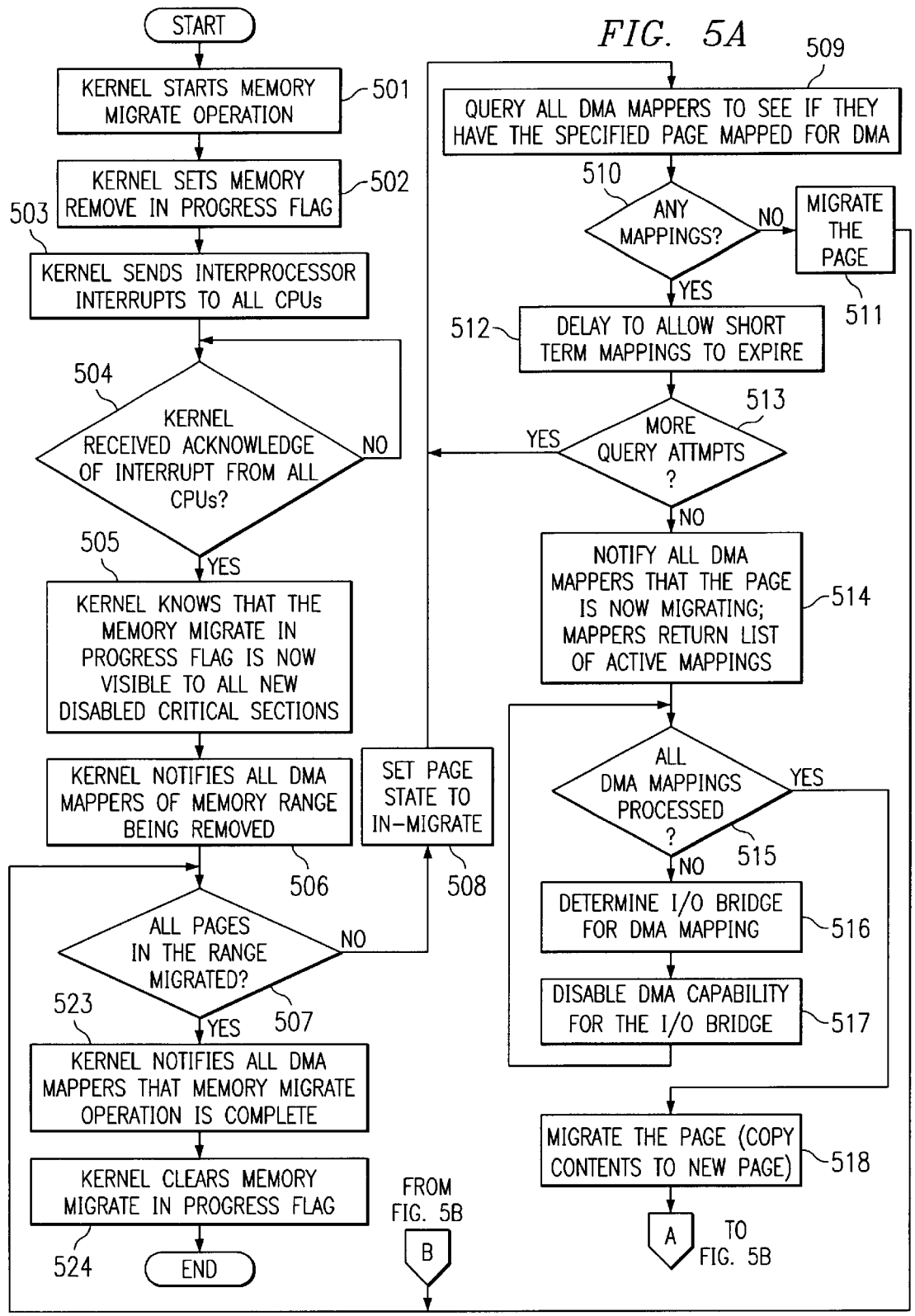

FIGS. 5A–5B are flowcharts outlining an exemplary operation for performing atomic memory migration in accordance with the present invention. As shown in FIGS. 5A–5B, the operation starts with the operating system kernel initiating a memory migration operation (step 501). The operating system kernel may initiate a memory migration for many different reasons including, for example:

(1) receiving a request to move memory from one logical partition to another;
(2) in response to predictive memory failure analysis;
(3) based on NUMA node level memory affinity/locality;
(4) the assembly of contiguous physical memory page frames (for a variety of reasons such as creating large pages, I/O restrictions, etc.).

The kernel then sets a memory migration progress flag (step 502) which is a system global variable. The kernel then sends interprocessor interrupts to all the CPUs of the system (step 503).

A determination is then made as to whether the kernel receives acknowledgments of the interrupt from all of the CPUs (step 504). If not, the operation continues to wait until it receives an acknowledgment of the interrupt from all of the CPUs. Once all of the CPUs acknowledge the interrupt, the kernel knows that that memory migration in progress flag is now visible to all new disabled critical sections (step 505). The kernel then notifies the DMA mappers of the memory address range being migrated (step 506). A "disabled critical section" is the logic executed after having serialized with the operating system kernel's memory migration operation. After setting this flag, sending interrupts to all CPUs, and receiving all acknowledgments, the operating system kernel knows that any subsequent (new) entries into these critical sections will see the new state of the memory migration in progress flag.

A determination is made as to whether all pages in the specified address range have been migrated (step 507). If not, the page state of the next page in memory to be migrated is set to in-migrate (step 508). A query is then sent to the DMA mappers to see if they have the specified page mapped for DMA operations (step 509).

A determination is made as to whether any of the DMA mappers have the specified page mapped for DMA operations (step 510). If not, the page is migrated (step 511) and the operation is returned to step 507. The migration of the page may include copying the page contents from an old physical page to a new physical page.

If there are any DMA mappers that have the specified page mapped for DMA operations, a delay of the start of migration is scheduled so that if the DMA operations are only transient, they may expire and the specified page will no longer be mapped for DMA operations (step 512). A determination is then made as to whether there are more query attempts to be performed (step 513), for example, due to repeatedly querying all DMA mappers for the same page. If so, the operation returns to step 509. Otherwise, if there are not more query attempts, the DMA mappers are notified that the specified page is now in a migrating state and the DMA mappers return a list of active mappings to that page (step 514).

A determination is made to see if all DMA mappings to the specified page have been processed (step 515). If not, then long term DMA mappings are still active and the kernel determines the I/O bridges for the active DMA mappings (step 516). The kernel then sends instructions to the platform specific mechanisms to disable the DMA capability for the I/O bridges (step 517) and returns to step 515.

Once all DMA mappings are processed, the page is migrated, i.e. The contents of the page are copied to a new page in memory (step 518). A determination is then made as to whether all DMA mappings that pointed to the migrated page have been updated to point to the new page (step 519). If not, the next DMA mapping that pointed to the migrated page is updated to point to the new page (step 520) and the operation returns to step 519. If all DMA mappings have been updated, DMA arbitration is re-enabled on all I/O bridges previously disabled (step 521) and the kernel notifies all the DMA mappers that the migration of the specified page is complete (step 522). The operation then returns to step 507.

Once all pages in the address range have been migrated (returning to step 507), the kernel notifies all of the DMA mappers that the memory migration operation is complete (step 523). The kernel then clears the memory migration in progress flag that was initially set (step 524) and the operation terminates.

FIG. 6 is a flowchart outlining an exemplary operation of a DMA mapper for a memory migration pending state. When the kernel sends the DMA mapper a notification of the memory range that is to be migrated (see step 506 of FIG. 5A), the event handler of the DMA mapper transitions to the memory migration pending state which causes the functions described in FIG. 6 to be performed. As shown in FIG. 6, the operation starts with the DMA mapper receiving the notification of the memory address range to be migrated (step 601). The DMA mapper allocates a physical to I/O virtual mapping address table for the memory range being migrated (step 602). This physical to I/O virtual mapping address table is created so as to keep track of those portions of memory that are in the I/O virtual to physical address mapping table of the DMA mapper that are within the address range of the memory being migrated.

The DMA mapper then sets the flag to require memory migration serialization (step 603) in a per DMA pool data structure. The DMA mapper then sends an interprocessor interrupt to all the CPUs in the computing system (step 604). A determination is then made as to whether all of the CPUs have acknowledged the interrupt (step 605). If not, the operation continues to wait until all CPUs acknowledge the interrupt. This process essentially serializes the DMA mapper with the migration operation being performed by the kernel.

The DMA mapper then acquires a lock for this DMA pool (step 606), i.e. the DMA pool for which a call to the DMA mapper state handler is made. Memory range migration information is then stored in a private memory associated with the DMA mapper (step 607). The memory range migration information may include, for example, the starting physical page address and number of pages representing the physical memory range to be migrated. The DMA mapper stores this information in a per DMA pool data structure.

A determination is then made as to whether all active mappings recorded in the I/O virtual to physical address mapping table of the DMA mapper have been processed (step 608). If not, the next mapping in the table is selected and a determination is made as to whether the physical address for the mapping is within the memory address range that is being migrated (step 609). If not, the operation returns to step 608. Otherwise, if the physical address is within the address range being migrated, the mapping is recorded in the physical to I/O virtual address mapping table created in step 602 and the operation returns to step 608.

Once all active mappings in the I/O virtual to physical address mapping table of the DMA mapper are processed, the lock on the DMA pool is released (step 611) and the operation ends.

Prior to initiating the migration of the memory address region, the operating system kernel queries the registered DMA mappers to determine if any of the DMA mappers have pages in the memory address region that is going to be migrated, mapped for DMA operations. This is the page query state described previously and outlined in FIG. 7 below.

Figure 7:
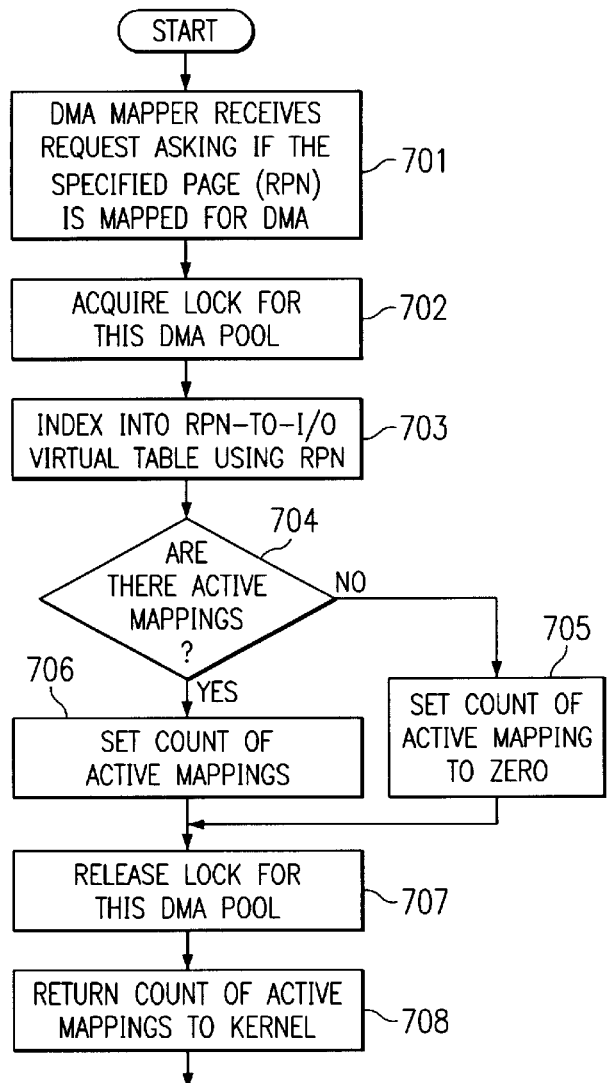
FIG. 7 is a flowchart outlining an exemplary operation of a DMA mapper for a page query state.

FIG. 7 is a flowchart outlining an exemplary operation of a DMA mapper for a page query state. As shown in FIG. 7, the operation starts with the DMA mapper receiving a request asking if a page, i.e. Physical page address, is mapped for DMA (step 701). A lock is acquired on the DMA pool (step 702), i.e. the DMA pool for which the call to the DMA mapper state handler is made. And the physical address of the page is used to index into the physical to I/O virtual address translation table stored by the DMA mapper (step 703).

A determination is made as to whether there are any physical to I/O virtual address translations active for the page (step 704). This may be determined, for example, by reading the table that was originally initialized by steps 608–610 and maintained by steps 311–312 and 412–413.

If not, the count of active mappings is set to zero (step 705). If there are active mappings for the page, the count of active mappings is set equal to the number of active mappings for the page (step 706). The lock on the DMA pool is then released (step 707) and a count of the active mappings is returned to the kernel (step 708). The operation then ends.

Once the operating system kernel receives the counts of active mappings from the DMA mappers, the operating system kernel sends a notification to the DMA mappers that a specified page is starting migration. This is the page migrate start state which is described above and outlined in FIG. 8 below.

Figure 8:
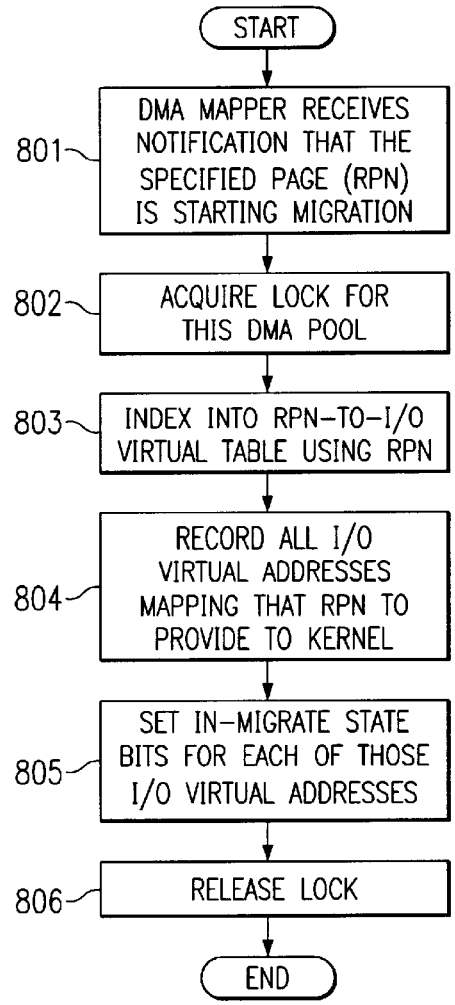
FIG. 8 is a flowchart outlining an exemplary operation of a DMA mapper for a page migrate start state.

FIG. 8 is a flowchart outlining an exemplary operation of a DMA mapper for a page migrate start state. As shown in FIG. 8, the operation starts with the DMA mapper receiving a notification that a specified page is starting migration (step 801). The DMA mapper acquires a lock for this DMA pool (step 802) and the physical address for the page is then used to index into the physical to I/O virtual address translation table (step 803). Then, all I/O virtual addresses mapping to that physical address are recorded in a data structure and provided to the operating system kernel (step 804). Each of the mappings in the physical to I/O virtual address translation table that have I/O virtual addresses mapping to the physical address for the page then have their state bits set to an in-migrate state (step 805). The lock on the DMA pool is then released (step 807) and the operation ends.

In an exemplary embodiment, the I/O bridge with the active mappings may be identified by identifying the owning I/O bridge logical bus number from the I/O virtual address mapping. The physical I/O bridge may then be identified from system topology data structures. The active mappings may then be disabled by clearing the I/O bridge specific DMA arbitration enable bit on the physical I/O bridge.

Once the DMA mappers have been notified of the start of the migration operation, and they have reported the I/O virtual addresses mapping to the physical address of the page (step 804), the operating system kernel may then migrate the page by using a platform specific migration mechanism to disable identified I/O bridges DMA arbitration, copy the contents of the page to a new page in memory, and reenable identified I/O bridges DMA arbitration. The operating system kernel then sends a notification to the DMA mappers that the migration of that page has ended. This initiates the page migrate end state in the DMA mappers as described above and outlined in FIG. 9 below.

Figure 9:
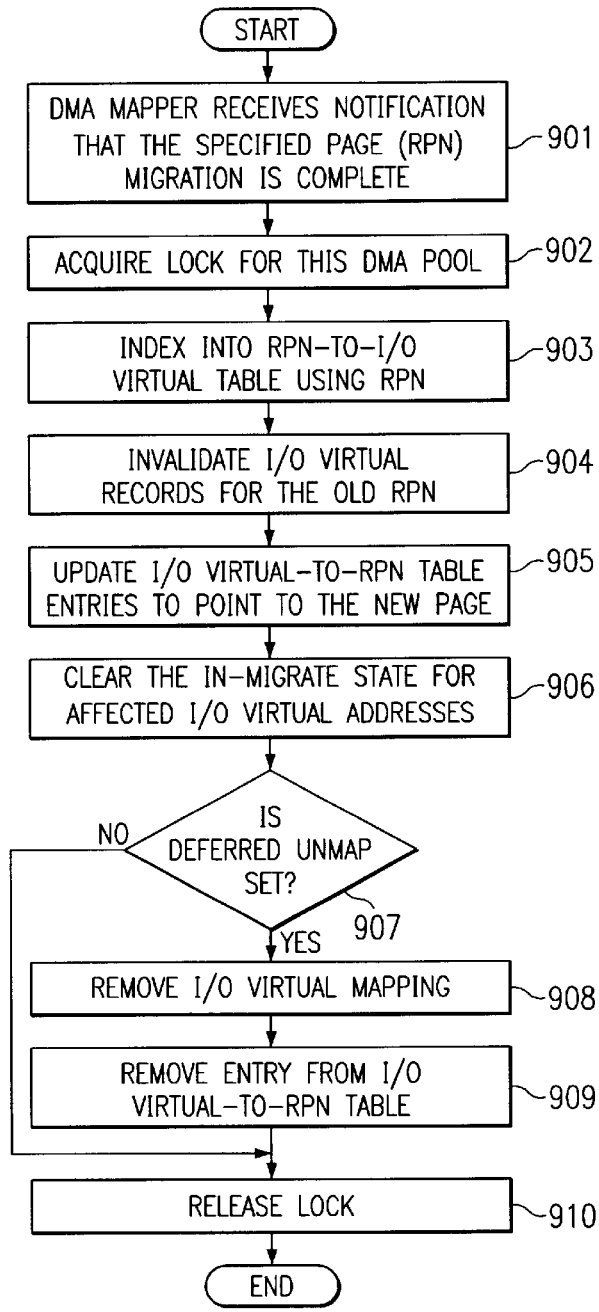
FIG. 9 is a flowchart outlining an exemplary operation of a DMA mapper for a page migrate end state.

FIG. 9 is a flowchart outlining an exemplary operation of a DMA mapper for a page migrate end state. As shown in FIG. 9, the operation starts with the DMA mapper receiving a notification from the operating system kernel that the specified page migration is complete (step 901). The DMA mapper then acquires a lock for the DMA pool (step 902) and uses the old physical address for the page to index into the physical to I/O virtual address translation table (step 903). The DMA mapper then invalidates the records in the physical to I/O virtual address translation table that map I/O virtual addresses to this old physical address (step 904).

The DMA mapper then updates the I/O virtual to physical address translation table entries to point to the new page to which the data was migrated (step 905). The in-migrate state for the affected I/O virtual addresses is then cleared (step 906).

A determination is then made as to whether there is a deferred unmap operation set for an I/O virtual mapping to the old page (step 907). If so, the I/O virtual mapping is removed from the I/O page table (step 908) and is removed from the I/O virtual to physical address translation table (step 909). The lock obtained on the DMA pool is then released (step 910) and the operation ends.

The operation shown in FIG. 9 is used update the mappings to the old page to point to the new page. The operations of FIGS. 7–9 may be repeated for each page of memory that is being migrated. Once all of the pages that are to be migrated have been migrated and the mappings to these pages updated, the operating system kernel sends a notification to the DMA mappers that there will not be any more migrations. This causes the DMA mappers to transition to the memory migration complete state described above and outlined in FIG. 10 below.

Figure 10:
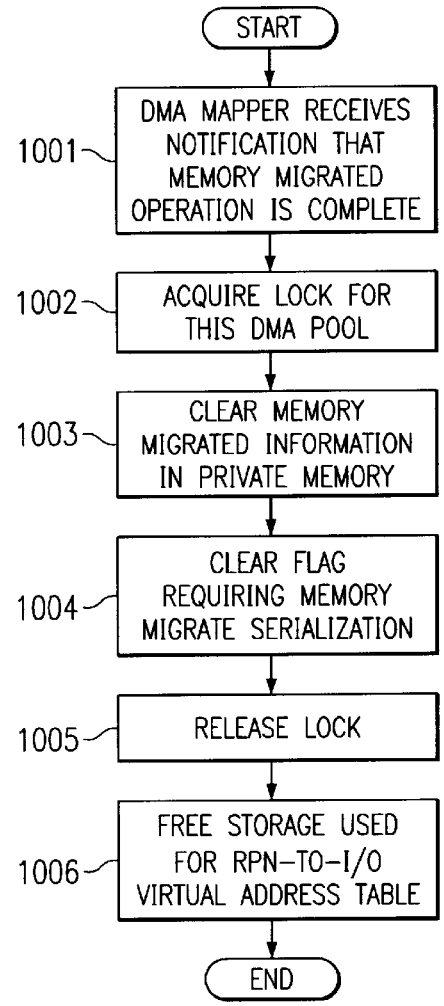
FIG. 10 is a flowchart outlining an exemplary operation of a DMA mapper for a memory migration complete state.

FIG. 10 is a flowchart outlining an exemplary operation of a DMA mapper for a memory migration complete state. As shown in FIG. 10, the operation starts with the DMA mapper receiving a notification that the memory migration operation is complete (step 1001). The DMA mapper then acquires a lock for this DMA pool (step 1002) and clears the memory migration information in the private memory (step 1003). The DMA mapper then clears the flag requiring memory migration serialization (step 1004) and releases the lock on the DMA pool (step 1005). The stored used for the physical to I/O virtual address translation table is then freed (step 1006) and the operation ends.

Thus, the present invention provides a mechanism for atomically migrating memory that is targeted for DMA operations. The apparatus and method of the present invention allows for notifying DMA mappers of the migration, serializing DMA operations on the memory being migrated, inhibiting DMA mappings on I/O bridges during the migration, and updating DMA mappings to reflect the new page to which the data was migrated once the migration is ended.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of migrating a memory page, comprising:
    sending a state notification from an operating system kernel to a Direct Memory Access (DMA) mapper;
    modifying a page migration state of a state machine associated with the DMA mapper based on the state notification; and
    performing one or more page migration operations based on the modification of the state of the state machine.

2. The method of claim 1, wherein the state machine has at least the following defined states: normal operation, memory migration pending, page query, page migrate start, page migrate end and memory migration complete.

3. The method of claim 1, wherein modifying the page migration state includes transitioning from a normal operation state to a memory migration pending state in response to a request to migrate a portion of memory.

4. The method of claim 3, wherein, in response to transitioning from a normal operation to a memory migration pending state, the DMA mapper establishes one or more data structures for tracking DMA mappings to the memory page.

5. The method of claim 3, wherein, in response to transitioning from a normal operation to a memory migration pending state, the DMA mapper sets a flag indicating that locking is required in all mapping paths and issues an interprocessor interrupt.

6. The method of claim 1, wherein modifying the page migration state includes transitioning from a memory migration pending state to a page query state in response to a query from an operating system kernel requesting whether the DMA mapper has the memory page mapped for DMA operations.

7. The method of claim 6, wherein, in response to transitioning from a memory migration pending state to a page query state, the DMA mapper determines if it has the memory page mapped for DMA operations and returns a result to the operating system kernel based on the determination.

8. The method of claim 1, wherein modifying the page migration state includes transitioning from a page query state to a page migration start state in response to receiving a notification from an operating system kernel that migration of the memory page has started.

9. The method of claim 8, wherein unmap attempts on the memory page are deferred while the state machine is in a page migration start state.

10. The method of claim 8, wherein, in response to transitioning from the page query state to the page migration start state, the operating system kernel retrieves all active DMA mappings from the DMA mapper and disables DMA arbitration for each active DMA mapping.

11. The method of claim 10, wherein the DMA arbitration for each active DMA mapping is disabled by clearing an arbitration enabled bit of an I/O bridge associated with the active DMA mapping.

12. The method of claim 1, wherein modifying the page migration state includes transitioning from a page migration start state to a page migration complete state in which any deferred unmap operations are performed.

13. The method of claim 12, wherein, in response to transitioning from the page migration start state to the page migration complete state, DMA mapper data structures are updated to reflect mappings to a new memory page to which the memory page was migrated.

14. The method of claim 1, wherein modifying the page migration state includes transitioning from a page migration complete state to a migration complete state in response to a determination that all memory pages have been migrated.

15. The method of claim 1, wherein the one or more page migration operations include:
   disabling DMA operations for one or more input/output (I/O) bridges having active DMA mappings to the memory page;
   migrating the memory page to a new memory page;
   reenabling DMA operations for the one or more I/O bridges; and
   updating mappings to the memory page to reflect the migration to the new memory page.

16. The method of claim 1, wherein the one or more page migration operations includes:
   notifying the DMA mapper that the memory page is to be migrated; and
   determining if the DMA mapper has the memory page targeted for DMA operations.

17. The method of claim 16, wherein if the DMA mapper has the memory page targeted for DMA operations, a predetermined time period is allowed to expire before migration of the memory page is performed.

18. The method of claim 17, wherein, after expiration of the predetermined time period, a determination is made as to whether the DMA mapper continues to have the memory page mapped for DMA operations and, in response to a determination that the DMA mapper continues to have the memory page mapped for DMA operations, DMA arbitration is disabled on an I/O bridge associated with a mapping of the memory page for DMA operations.

19. A computer program product in a computer readable medium for migrating a memory page, comprising:
   first instructions for sending a state notification from an operating system kernel to a Direct Memory Access (DMA) mapper;
   second instructions for modifying a page migration state of a state machine associated with the DMA mapper based on the state notification; and
   third instructions for performing one or more page migration operations based on the modification of the state of the state machine.

20. The computer program product of claim 19, wherein the state machine has at least the following defined states: normal operation, memory migration pending, page query, page migrate start, page migrate end and memory migration complete.

21. The computer program product of claim 19, wherein the second instructions for modifying the page migration state include instructions for transitioning from a normal operation state to a memory migration pending state in response to a request to migrate a portion of memory.

22. The computer program product of claim 21, wherein, in response to transitioning from a normal operation to a memory migration pending state, the DMA mapper establishes one or more data structures for tracking DMA mappings to the memory page.

23. The computer program product of claim 21, wherein, in response to transitioning from a normal operation to a memory migration pending state, the DMA mapper sets a flag indicating that locking is required in all mapping paths and issues an interprocessor interrupt.

24. The computer program product of claim 19, wherein the second instructions for modifying the page migration state include instructions for transitioning from a memory migration pending state to a page query state in response to a query from an operating system kernel requesting whether the DMA mapper has the memory page mapped for DMA operations.

25. The computer program product of claim 24, wherein, in response to transitioning from a memory migration pending state to a page query state, the DMA mapper determines if it has the memory page mapped for DMA operations and returns a result to the operating system kernel based on the determination.

26. The computer program product of claim 19, wherein the second instructions for modifying the page migration state include instructions for transitioning from a page query state to a page migration start state in response to receiving a notification from an operating system kernel that migration of the memory page has started.

27. The computer program product of claim 26, wherein unmap attempts on the memory page are deferred while the state machine is in a page migration start state.

28. The computer program product of claim 26, wherein, in response to transitioning from the page query state to the page migration start state, the operating system kernel retrieves all active DMA mappings from the DMA mapper and disables DMA arbitration for each active DMA mapping.

29. The computer program product of claim 28, wherein the DMA arbitration for each active DMA mapping is disabled by clearing an arbitration enabled bit of an I/O bridge associated with the active DMA mapping.

30. The computer program product of claim 19, wherein the second instructions for modifying the page migration state include instructions for transitioning from a page migration start state to a page migration complete state in which any deferred unmap operations are performed.

31. The computer program product of claim 30, wherein, in response to transitioning from the page migration start state to the page migration complete state, DMA mapper data structures are updated to reflect mappings to a new memory page to which the memory page was migrated.

32. The computer program product of claim 19, wherein the second instructions for modifying the page migration state include instructions for transitioning from a page migration complete state to a migration complete state in response to a determination that all memory pages have been migrated.

33. The computer program product of claim 19, wherein the third instructions for performing one or more page migration operations include:
   instructions for disabling DMA operations for one or more input/output (I/O) bridges having active DMA mappings to the memory page;
   instructions for migrating the memory page to a new memory page;
   instructions for reenabling DMA operations for the one or more I/O bridges; and
   instructions for updating mappings to the memory page to reflect the migration to the new memory page.

34. The computer program product of claim 19, wherein the third instructions for performing one or more page migration operations include:
   instructions for notifying the DMA mapper that the memory page is to be migrated; and instructions for determining if the DMA mapper has the memory page targeted for DMA operations.

35. The computer program product of claim 34, wherein if the DMA mapper has the memory page targeted for DMA operations, a predetermined time period is allowed to expire before migration of the memory page is performed.

36. The computer program product of claim 35, wherein, after expiration of the predetermined time period, a determination is made as to whether the DMA mapper continues to have the memory page mapped for DMA operations and, in response to a determination that the DMA mapper continues to have the memory page mapped for DMA operations, DMA arbitration is disabled on an I/O bridge associated with a mapping of the memory page for DMA operations.

37. An apparatus for migrating a memory page, comprising:

means for sending a state notification from an operating system kernel to a Direct Memory Access (DMA) mapper;

means for modifying a page migration state of a state machine associated with the DMA mapper based on the state notification; and means for performing one or more page migration operations based on the modification of the state of the state machine.

* * * * *